(12) United States Patent
Ji et al.

(10) Patent No.: US 10,340,798 B2
(45) Date of Patent: Jul. 2, 2019

(54) SWITCHING CONTROL METHOD FOR A DUAL AUXILIARY POWER SUPPLY

(71) Applicant: Dong Guan Juxing Power Co., Ltd., Dongguan, Guangdong (CN)

(72) Inventors: Yexin Ji, Dongguan (CN); Yuefei Liao, Dongguan (CN)

(73) Assignee: Dong Guan Juxing Power Co., Ltd., Dongguan (CN)

( * ) Notice: Subject to any disclaimer, the term of this patent is extended or adjusted under 35 U.S.C. 154(b) by 0 days.

(21) Appl. No.: 15/877,344

(22) Filed: Jan. 22, 2018

(65) Prior Publication Data

US 2019/0013694 A1   Jan. 10, 2019

(30) Foreign Application Priority Data

Jul. 4, 2017 (CN) .......................... 2017 1 0535165
Jul. 4, 2017 (CN) ..................... 2017 2 0795487 U

(51) Int. Cl.
*H02M 3/158*    (2006.01)

(52) U.S. Cl.
CPC ......... *H02M 3/158* (2013.01); *H02M 3/1584* (2013.01)

(58) Field of Classification Search
CPC .......................................... H02M 3/158–1588
See application file for complete search history.

(56) References Cited

U.S. PATENT DOCUMENTS

| | | | | |
|---|---|---|---|---|
| 8,345,454 B1* | 1/2013 | Krolak | .................... | H02M 7/42 307/31 |
| 9,385,608 B1* | 7/2016 | Chakraborty | ....... | H02M 3/1584 |
| 2003/0178974 A1* | 9/2003 | Rozsypal | ............ | H02M 3/1582 323/224 |
| 2009/0292372 A1* | 11/2009 | Burg | ...................... | G06F 9/4411 700/1 |
| 2017/0054134 A1* | 2/2017 | Choi | ...................... | H02J 7/0013 |
| 2017/0207723 A1* | 7/2017 | Zhang | ................... | H02M 7/537 |
| 2018/0198416 A1* | 7/2018 | Hur | ........................ | H03F 1/0238 |

* cited by examiner

*Primary Examiner* — Gary L Laxton
*Assistant Examiner* — Peter M Novak

(57) ABSTRACT

The present invention discloses a switching control method for a dual auxiliary power supply comprising a master control module, a main auxiliary power supply, and a sleep auxiliary power supply, wherein the master control module controls the main auxiliary power supply by a switch control unit, and is further coupled to a trigger detection circuit powered by the sleep auxiliary power supply; and the main auxiliary power supply outputs a control signal to an energy conversion module. The sleep auxiliary power supply is constantly in an operation state; under the control of the switch control unit, (1) the main auxiliary power supply is in a locked state when no trigger signal is detected or the trigger signal is invalid, and (2) the main auxiliary power supply is in an operation state when a trigger signal is detected or a startup instruction is received.

9 Claims, 2 Drawing Sheets

SWITCHING CONTROL METHOD FOR A DUAL AUXILIARY POWER SUPPLY

TECHNICAL FIELD

The present invention relates to a switching control method for a dual auxiliary power supply.

BACKGROUND

At present, most of the energy storage systems are activated and operate only in case of power interruption or when there is a need to use it. Under normal circumstances, the energy storage system is in an off-working state, in which the energy storage system is required to consume no power or consume as little power as possible. The energy storage systems at present mostly operate in the following two modes. In a first mode, a mechanical switch is adopted. When the energy storage system is not required, the mechanical switch is turned off and the energy storage system does not work at all. This mode suffers from high cost, and especially in large-current situations, the mechanical switch are quite expensive. Moreover, the problem of delayed response and cumbersome operation exist. A second mode is a direct standby mode. In this mode, a single auxiliary power supply is adopted, the standby power consumption is high, causing great energy loss, thus increasing the number of charging and discharging cycles and affecting the life of a battery. Therefore, there is a need for designing a new switching control method for a dual auxiliary power supply.

SUMMARY

In view of the technical problems above, the present invention provides a switching control method for a dual auxiliary power supply, which allows saving of standby energy consumption and quick response.

The following technical solutions are adopted in the present invention.

A switching control method for a dual auxiliary power supply is provided, where said dual auxiliary power supply comprises a main auxiliary power supply, a sleep auxiliary power supply, and a master control module serving as a switching control module.

Said main auxiliary power supply and said sleep auxiliary power supply are both powered by an energy storage battery.

Said main auxiliary power supply and said sleep auxiliary power supply are connected respectively to two power supply terminals of said master control module.

Said master control module controls said main auxiliary power supply by a switch control unit.

Said master control module is further coupled to a trigger detection circuit which is powered by said sleep auxiliary power supply.

Said main auxiliary power supply outputs a control signal to an energy conversion module.

Said sleep auxiliary power supply is constantly in an operation state, and said control is conducted according to a signal detected by said trigger detection circuit or an instruction received by said master control module, where (1) when no trigger signal is detected by said trigger detection circuit or a detected trigger signal is invalid, said main auxiliary power supply is in a lockout state under said control of said switch control unit; and (2) when a trigger signal is detected by said trigger detection circuit or a start-up instruction is received by said master control module, said main auxiliary power supply is in an operation state under said control of said switch control unit.

Said master control module is a single chip microcomputer (SCM), DSP, or ARM processor.

Said signal detected by said trigger detection circuit is a startup signal generated when a user presses a button, or a power interruption signal.

Said switch control unit comprises a first transistor of PMOS-type, a second transistor of NMOS-type, and a third transistor of PNP-type.

SPS_CNTL is an enabling control signal for controlling said main auxiliary power supply, a SPS_CNTL terminal is connected to a first pole of said third transistor; a second pole of said third transistor is grounded; a first resistor is connected between a third pole of said third transistor and said SPS_CNTL terminal; and a second resistor is connected between said third pole and said second pole of said third transistor.

Said third pole of said third transistor is further connected to a first pole of said second transistor; a third pole of said second transistor is grounded; and a second pole of said second transistor is connected via a third resistor to a first pole of said first transistor.

A third pole of said first transistor is connected to a BAT+ terminal of a power supply voltage; a second pole of said first transistor powers said main auxiliary power supply; and a forth resistor is connected between said second pole and said third pole of said first transistor.

Said main auxiliary power supply and said sleep auxiliary power supply are both an integrated circuit based on a LDO (that is, a low dropout regulator), and a static standby current of said sleep auxiliary power supply is at a μA level.

Both said main auxiliary power supply and said sleep auxiliary power supply have an output voltage of 5V.

Said master control module is further connected to a communication circuit.

An energy storage circuit supplies power to an electrical device or power grid through an energy conversion circuit that is controlled by said main auxiliary power supply.

Said energy storage battery is further connected to a charging circuit.

Said energy conversion circuit is a DC-DC converter circuit or a DC-AC inverter circuit.

The master control module is further connected to a control circuit, a sampling circuit, an alarm circuit, a human-machine interaction circuit, and the communication circuit.

Control circuit: The control circuit is a control center of an entire energy storage system, which receives a signal acquired by the sampling circuit and an instruction and information from the communication circuit. The control circuit processes these signal, instruction and information and then responds, sends an instruction and information via the communication circuit (communication module), displays status information of the energy storage system, provides a control signal to an electronic switch of the dual auxiliary power supply for state switching, and provides a control signal to an electronic switch of a first DC-DC converter, a second DC-DC converter, an inverter, and a charge input of the energy conversion system. The control circuit is generally a MCU, which is an existing mature technology.

Sampling circuit: The sampling circuit is used for signal acquisition, collecting the battery voltage, current, and charging input voltage and current of the energy storage system, as well as the input voltage and current, output voltage and current, protection status and other information of the first DC-DC converter, the second DC-DC converter, and the inverter of the energy conversion system.

Alarm circuit: When a signal acquired by the sampling circuit is abnormal, the control circuit conveys an abnormal status of the energy storage system to a user via the alarm circuit in manner of an acoustic-optical signal.

Communication circuit: The control circuit transfers a status signal of the dual auxiliary power supply to a upper computer or a remote control center and receives a control instruction from the upper computer or the remote control center via the communication circuit, and obtains information of the voltage, current, temperature, and protection status of the energy storage battery via the communication circuit.

Human-machine interaction circuit: The human-machine interaction circuit is a display screen, a keyboard, or other devices.

In the present invention, a main auxiliary power supply and a sleep auxiliary power supply are designed. The main auxiliary power supply is connected to the master control circuit, the energy conversion system, the control circuit, the sampling circuit, the alarm circuit, the communication circuit, the human-machine interaction circuit, and other circuit modules, to provide the power required for normal operation of these circuit modules. The sleep auxiliary power supply is connected to the master control circuit and the trigger detection circuit, to provide the power required when the system enters a sleep mode.

The main auxiliary power supply is large in power consumption, but has a strong loading capability to meet the energy needed in full load operation of the master control circuit, the energy conversion system, the control circuit, the sampling circuit, the alarm circuit, the communication circuit, the human-machine interaction circuit, and other circuit modules. The sleep auxiliary power supply is extremely low in standby power consumption with a static standby current at merely μA level, but can provide an energy that is sufficient to meet the power demand in sleep state of the master control circuit and the trigger detection circuit.

The energy storage system is kept in a sleep state when not in use. When a user presses a startup button or sends a startup instruction or the power grid is interrupted and the energy storage system is switched from the standby sleep state to an operation state, the master control circuit turns on the main auxiliary power supply by switch control, such that the main auxiliary power supply provides power to the master control circuit, the energy conversion system, the control circuit, the sampling circuit, the alarm circuit, the communication circuit, the human-machine interaction circuit and other circuit modules, and thus the energy storage system enters the operation state rapidly.

When the user presses a shutdown button or sends a shutdown instruction or the power grid returns to be normal and the energy storage system enters from the operation state to a standby sleep state, the master control circuit prohibits the operation of the main auxiliary power supply by switch control. At this time, the energy conversion system, the control circuit, the sampling circuit, the alarm circuit, the communication circuit, the human-machine interaction circuit and other circuit modules are in a non-operation state due to the lack of power supply, and will not consume power any more. At the same time, the master control module also enters the sleep state, and only an external interrupt trigger module is turned on to respond to the trigger detection circuit, upon which the standby current of the master control module is also at a μA level. When the energy storage system is in the standby sleep state, only the master control module and the trigger detection circuit in the system are in an operation state, and the standby current is at a μA level. The power supply of the sleep auxiliary power supply is sufficient for satisfying the power demand.

Such a design can not only meet the auxiliary power required by the energy storage system during normal operation, but also meet the low power consumption demand of the energy storage system in a standby sleep state, thereby reducing energy consumption. In the standby sleep mode, the trigger detection circuit is in an operation state, to ensure the timely response of the energy storage system.

Beneficial Effect:

Compared with the prior art, in the switching control method for dual auxiliary power supply of the present invention, a dual-auxiliary-power-supply design is adopted, and auxiliary power supplies with different design requirements are used in the operation and standby sleep states, thus solving the problems of high cost of mechanical switches and delayed response, and solving the problem of high energy consumption of a single auxiliary power supply. The dual-auxiliary-power-supply design in the present invention can not only meet the energy required by the energy storage system during normal operation, but also meet the low power consumption demand of the energy storage system in a standby sleep state, so as to reduce energy consumption. In the standby sleep mode, the trigger detection circuit is in an operation state, to ensure the timely response of the energy storage system.

DESCRIPTION OF THE EMBODIMENTS

Hereinafter, the present invention will be described in further detail with reference to specific embodiments and accompanying drawings.

Figure 1:
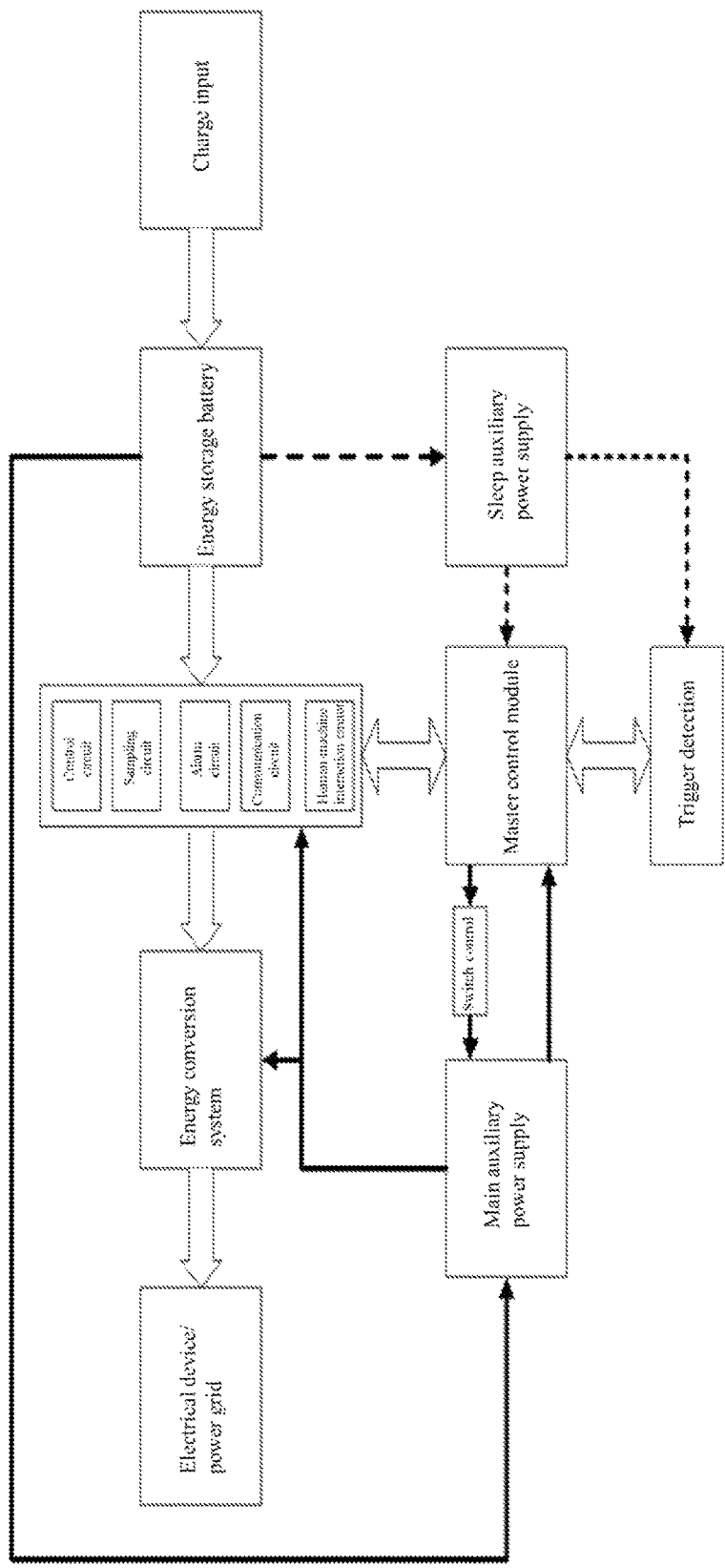
FIG. 1 is an overall structural block diagram of an energy storage system based on a dual auxiliary power supply.
Figure 2:
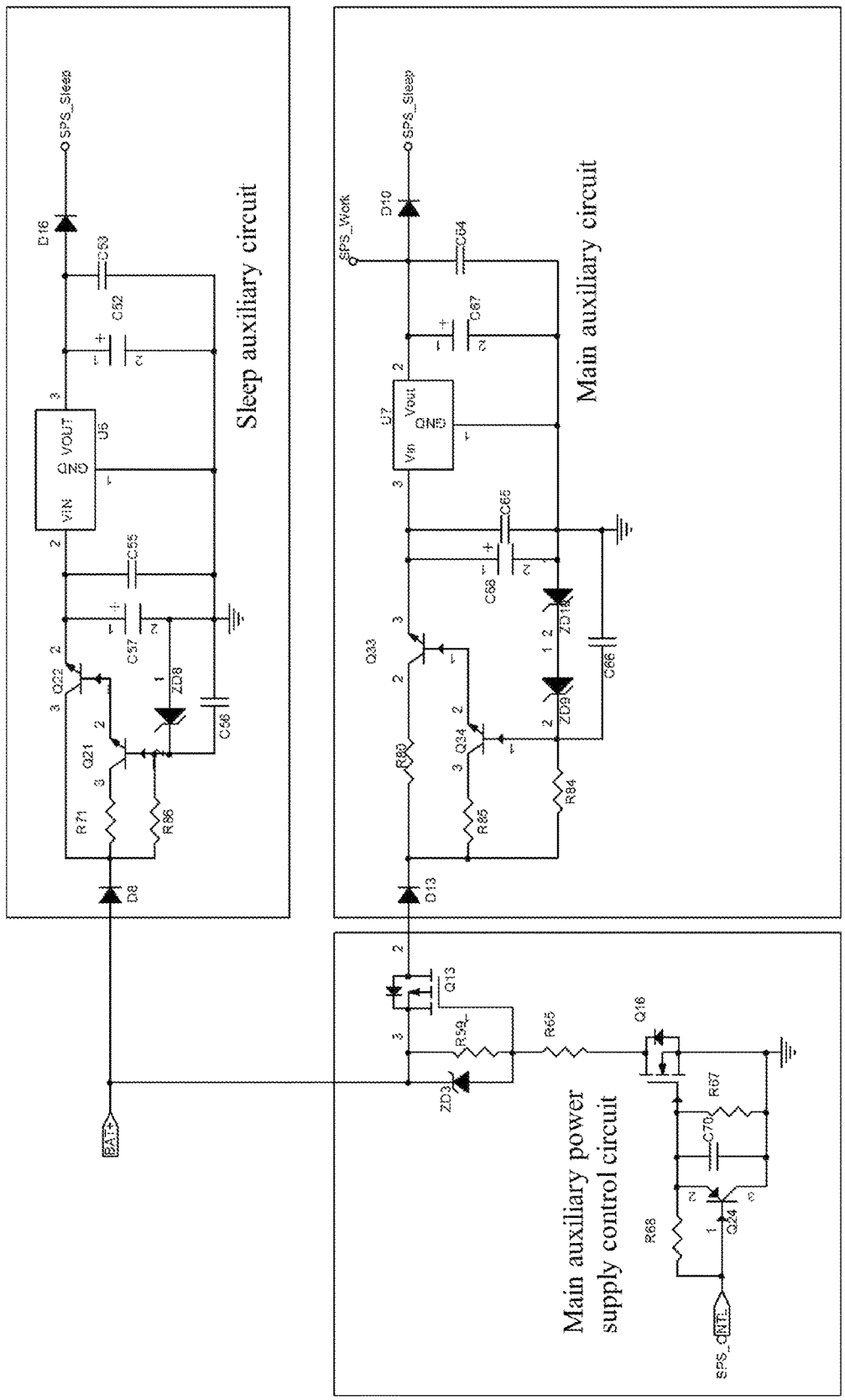
FIG. 2 shows the principle of a switch portion, a main auxiliary power supply, and a sleep auxiliary power supply in a dual auxiliary power supply.

Embodiment 1: As shown in FIGS. 1 and 2, a switching control method for a dual auxiliary power supply is provided, where the dual auxiliary power supply comprises a main auxiliary power supply, a sleep auxiliary power supply, and a master control module serving as a switching control module.

The main auxiliary power supply and the sleep auxiliary power supply are both powered by an energy storage battery.

The main auxiliary power supply and the sleep auxiliary power supply are connected respectively to two power supply terminals of the master control module.

The master control module controls the main auxiliary power supply by a switch control unit.

The master control module is further coupled to a trigger detection circuit which is powered by the sleep auxiliary power supply.

The main auxiliary power supply outputs a control signal to an energy conversion module.

The sleep auxiliary power supply is constantly in an operation state, and the control is conducted according to a signal detected by the trigger detection circuit or an instruction received by the master control module, where (1) when no trigger signal is detected by the trigger detection circuit or a detected trigger signal is invalid, the main auxiliary power supply is in a lockout state under the control of the switch control unit; and (2) when a trigger signal is detected by the trigger detection circuit or a start-up instruction is received by the master control module, the main auxiliary power supply is in an operation state under the control of the switch control unit.

The master control module is a single chip microcomputer (SCM), DSP, or ARM processor.

The signal detected by the trigger detection circuit is a startup signal generated when a user presses a button, or a power interruption signal.

The switch control unit comprises a PMOS transistor Q13, a NMOS transistor Q16, and a PNP-type transistor Q24.

SPS_CNTL is an enabling control signal for controlling a main auxiliary power supply, a SPS_CNTL terminal is connected to a pole b of the transistor Q24; a pole c of the transistor Q24 is grounded; a resistor R68 is connected between a pole e of the transistor Q24 and the SPS_CNTL terminal; and a resistor R67 is connected between the pole e and the pole c of the transistor Q24.

The pole e of the transistor Q24 is further connected to a pole G of the NMOS transistor Q16; a pole S of the NMOS transistor Q16 is grounded; and a pole D of the NMOS transistor Q16 is connected via a resistor R65 to a pole G of the PMOS transistor Q13.

A pole S of the PMOS transistor Q13 is connected to a BAT+ terminal of a power supply voltage (where BAT+ may be a voltage of an energy storage battery); a pole D of the PMOS transistor Q13 powers the main auxiliary power supply, that is, the pole D of the PMOS transistor Q13 is connected to a power input terminal of the main auxiliary power supply; and a resistor R59 is connected between the poles D and S of the PMOS transistor Q13.

The main auxiliary power supply and the sleep auxiliary power supply are both an integrated circuit based on a LDO (that is, a low dropout regulator), and a static standby current of the sleep auxiliary power supply is at a μA level.

Both the main auxiliary power supply and the sleep auxiliary power supply have an output voltage of 5V.

The master control module is further connected to a communication circuit.

An energy storage circuit supplies power to an electrical device or power grid through an energy conversion circuit that is controlled by the main auxiliary power supply.

The energy storage battery is further connected to a charging circuit.

The energy conversion circuit is a DC-DC converter circuit or a DC-AC inverter circuit.

Definitions in the schematic diagram of FIG. 2
BAT+ - - - Power input of the energy storage battery
SPS_CNTL - - - Enabling control signal for controlling the main auxiliary power supply
SPS_Work - - - Electrical power provided from the main auxiliary power supply to the master control circuit, the energy conversion system, the control circuit, the sampling circuit, the alarm circuit, the communication circuit, the human-machine interaction circuit, and other modules.
SPS_Sleep - - - Electrical power provided from the sleep auxiliary power supply to the master control circuit and the trigger detection circuit.
U6 - - - Linear LDO with a static standby current at μA level, preferably S812C50AMC-C3E-T2G from Seiko Co., Ltd., which has an output voltage of +5 Vdc, where U6 and its peripheral circuits power the master control circuit and the trigger detection module in the energy storage system in a sleep state.
U7 - - - Linear LDO with an extremely strong loading capability, preferably LM1117IDTX-5.0 from TI, which has an output voltage of +5 Vdc, where U7 and its peripheral circuits meet the power demand of the master control circuit, the energy conversion system, the control circuit, the sampling circuit, the alarm circuit, the communication circuit, the human-machine interaction circuit, and other modules in the energy storage system during normal operation.
Q13 - - - PMOS transistor serving as an electronic switch, which has a $V_{DS}$ of greater than 30V, and a $I_D(A)$ of greater than 2 A and is preferably IRLML9301TRPBF from IR in the present invention.

Control Principle:

When the energy storage system is in a sleep state, the sleep auxiliary power supply powers the master control circuit and the trigger detection module of the energy storage system in the sleep state. At this time, the energy consumption of the entire energy storage system is at μA level, and the standby power consumption is extremely low, thus greatly reducing the energy consumption. When the trigger detection module detects that a user presses a startup button or sends a startup instruction or the power grid is interrupted, the trigger detection module wakes up the master control module in the sleep state, and the master control module sets SPS_CNTL at a high level, to turn on the PMOS transistor Q13. After the PMOS transistor Q13 is conducted, the main auxiliary power supply operates to power the master control circuit, the energy conversion system, the control circuit, the sampling circuit, the alarm circuit, the communication circuit, the human-machine interaction circuit, and other modules, so the energy storage system enters an operation state. When the energy storage system is shut down, the master control circuit sets SPS_CNTL at a low level, so the PMOS transistor Q13 is turned off, and the main auxiliary power supply stops operation. At this time, the energy conversion system, the control circuit, the sampling circuit, the alarm circuit, the communication circuit, and the human-machine interaction circuit also stop operation, so the energy storage system enters a sleep state. Therefore, the standby power consumption of the energy storage system is greatly reduced. At this time, the trigger detection module is still powered by the sleep auxiliary power supply, and can detect external excitation signals such as startup signal, so as to trigger the master control module to enter the operation state and guarantee the real-time responsiveness of the energy storage system.

What is claimed is:

1. A switching control method for a dual auxiliary power supply, wherein said dual auxiliary power supply comprises a main auxiliary power supply, a sleep auxiliary power supply, and a master control module serving as a switching control module, wherein said main auxiliary power supply and said sleep auxiliary power supply are both powered by an energy storage battery;
   said main auxiliary power supply and said sleep auxiliary power supply are connected respectively to two power supply terminals of said master control module;
   said master control module controls said main auxiliary power supply by a switch control unit;
   said master control module is further coupled to a trigger detection circuit which is powered by the sleep auxiliary power supply;

said main auxiliary power supply outputs a control signal to an energy conversion module; and said sleep auxiliary power supply is constantly in an operation state, and said control is conducted according to a signal detected by said trigger detection circuit or an instruction received by said master control module, where (1) when no trigger signal is detected by said trigger detection circuit or a detected trigger signal is invalid, said main auxiliary power supply is in a lockout state under said control of said switch control unit; and (2) when a trigger signal is detected by said trigger detection circuit or a start-up instruction is received by the master control module, said main auxiliary power supply is in an operation state under said control of said switch control unit, wherein said switch control unit comprises a first transistor of PMOS-type, a second transistor of NMOS-type, and a third transistor of PNP-type;

SPS_CNTL is an enabling control signal for controlling said main auxiliary power supply, a SPS_CNTL terminal is connected to a first pole of said third transistor; a second pole of said third transistor is grounded; a first resistor is connected between a third pole of said third transistor and said SPS_CNTL terminal;

and a second resistor is connected between said third pole and said second pole of said third transistor;

said third pole of said third transistor is further connected to a first pole of said second transistor; a third pole of said second transistor is grounded; and a second pole of said second transistor is connected via a third resistor to a first pole of said first transistor; and a third pole of said first transistor is connected to a BAT+ terminal of a power supply voltage; a second pole of said first transistor powers said main auxiliary power supply; and a forth resistor is connected between said second pole and said third pole of said first transistor.

2. The switching control method for a dual auxiliary power supply according to claim 1, wherein said master control module is a single chip microcomputer (SCM), DSP, or ARM processor.

3. The switching control method for a dual auxiliary power supply according to claim 1, wherein said signal detected by said trigger detection circuit is a startup signal generated when a user presses a button, or a power interruption signal.

4. The switching control method for a dual auxiliary power supply according to claim 1, wherein said main auxiliary power supply and said sleep auxiliary power supply are both an integrated circuit based on a LDO, and a static standby current of said sleep auxiliary power supply is at a μA level.

5. The switching control method for a dual auxiliary power supply according to claim 1, wherein both said main auxiliary power supply and said sleep auxiliary power supply have an output voltage of 5V.

6. The switching control method for a dual auxiliary power supply according to claim 1, wherein said master control module is further connected to a communication circuit.

7. The switching control method for a dual auxiliary power supply according to claim 1, wherein an energy storage circuit supplies power to an electrical device or grid through an energy conversion circuit that is controlled by said main auxiliary power supply.

8. The switching control method for a dual auxiliary power supply according to claim 7, wherein said energy storage battery is further connected to a charging circuit.

9. The switching control method for a dual auxiliary power supply according to claim 8, wherein said energy conversion circuit is a DC-DC converter circuit or a DC-AC inverter circuit.

* * * * *